US010632831B2

(12) United States Patent
Orozco Santos Coy et al.

(10) Patent No.: US 10,632,831 B2
(45) Date of Patent: Apr. 28, 2020

(54) SYSTEM AND METHOD FOR BATTERY CHARGING OF A FUEL CELL PLUG-IN HYBRID VEHICLE HAVING AN ELECTRIC COMPRESSOR OR TURBOCHARGER (71) Applicant: FORD GLOBAL TECHNOLOGIES, LLC, Dearborn, MI (US)

(72) Inventors: Julio Orozco Santos Coy, Aachen (DE); Arnulf Sponheimer, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 24 days.

(21) Appl. No.: 16/202,447

(22) Filed: Nov. 28, 2018

(65) Prior Publication Data
US 2019/0160935 A1 May 30, 2019

(30) Foreign Application Priority Data

Nov. 29, 2017 (DE) .................. 10 2017 221 370

(51) Int. Cl.
*H01M 8/04291* (2016.01)
*H01M 8/04119* (2016.01)
(Continued)

(52) U.S. Cl.
CPC .................. *B60K 6/32* (2013.01); *B60K 6/28* (2013.01); *B60L 1/003* (2013.01); *B60L 15/007* (2013.01);
(Continued)

(58) Field of Classification Search
CPC ............ H02M 7/5387; B60Y 2200/92; H01M 8/04753; H01M 8/04544; H01M 16/006; B60K 6/28; B60L 1/003; B60L 15/007
See application file for complete search history.

(56) References Cited

U.S. PATENT DOCUMENTS 4,920,475 A 4/1990 Rippel
5,099,186 A 3/1992 Rippel et al.
(Continued)

FOREIGN PATENT DOCUMENTS

DE 102012022646 A1 5/2014
DE 102015010114 A1 3/2016
(Continued)

OTHER PUBLICATIONS

Haghbin, Saeid et al. Grid-Connected Integrated Battery Charges in Vehicle Applications: Review and New Solution. IEEE Transactions on Industrial Electonics, vol. 60, No. 2. Feb. 2013. 15 pages.
(Continued)

*Primary Examiner* — Alfonso Perez Borroto
*Assistant Examiner* — Esayas G Yeshaw
(74) *Attorney, Agent, or Firm* — David Kelley; Brooks Kushman P.C.

(57) ABSTRACT

A fuel cell plug-in hybrid vehicle includes a fuel cell having an anode side and a cathode side with a compressor connected to the cathode side. An electric motor is drive-connected exclusively to the compressor. A converter is connected electrically on one side to the motor and on the other side to a high-voltage battery. A controller switches the vehicle between two different operating states. In a first operating state, the high-voltage battery supplies electrical power to the motor via the converter so that the electric motor drives the compressor. In a second operating state, an electrical voltage is supplied from a power supply system to the motor or to the converter via a power supply line. The motor can modify the amplitude of the system voltage with the modified voltage present across the converter, which converts the voltage into a DC voltage applied across the high-voltage battery.

20 Claims, 4 Drawing Sheets (51) Int. Cl.

| | | |
|---|---|---|
| *H01M 8/04828* | (2016.01) | |
| *H01M 8/04746* | (2016.01) | |
| *B60K 6/32* | (2007.10) | |
| *H01M 16/00* | (2006.01) | |
| *H01M 8/04111* | (2016.01) | |
| *B60L 58/40* | (2019.01) | |
| *B60L 53/22* | (2019.01) | |
| *B60L 50/51* | (2019.01) | |
| *B60L 50/75* | (2019.01) | |
| *B60L 50/72* | (2019.01) | |
| *B60L 15/00* | (2006.01) | |
| *B60L 53/14* | (2019.01) | |
| *B60L 1/00* | (2006.01) | |
| *B60K 6/28* | (2007.10) | |
| *H01M 8/04537* | (2016.01) | |
| *H01M 10/46* | (2006.01) | |
| *H02M 7/5387* | (2007.01) | |

(52) U.S. Cl.
CPC ............ *B60L 50/51* (2019.02); *B60L 50/72* (2019.02); *B60L 50/75* (2019.02); *B60L 53/14* (2019.02); *B60L 53/22* (2019.02); *B60L 58/40* (2019.02); *H01M 8/04111* (2013.01); *H01M 8/04544* (2013.01); *H01M 8/04753* (2013.01); *H01M 8/04776* (2013.01); *H01M 10/46* (2013.01); *H01M 16/006* (2013.01); *B60Y 2200/92* (2013.01); *B60Y 2300/91* (2013.01); *B60Y 2400/202* (2013.01); *H01M 2220/20* (2013.01); *H01M 2250/20* (2013.01); *H02M 7/5387* (2013.01)

(56) References Cited

U.S. PATENT DOCUMENTS

| | | | |
|---|---|---|---|
| 5,341,075 | A | 8/1994 | Cocconi |
| 7,743,861 | B2 | 6/2010 | Grieve |
| 9,067,477 | B2 | 6/2015 | Onimaru et al. |
| 9,242,575 | B2 | 1/2016 | Kim et al. |
| 9,278,625 | B2 | 3/2016 | Obayashi et al. |
| 987,334 | A1 | 1/2018 | De Sousa et al. |
| 9,873,342 | B2 | 1/2018 | De Sousa et al. |
| 2004/0062059 | A1 | 4/2004 | Cheng et al. |
| 2007/0287046 | A1 | 12/2007 | Koda et al. |
| 2010/0013438 | A1 | 1/2010 | Anwar et al. |
| 2015/0112525 | A1* | 4/2015 | Johri ............... B60W 10/06 701/22 |
| 2015/0275788 | A1* | 10/2015 | Dufford ............ F02D 29/02 701/102 |
| 2015/0336471 | A1* | 11/2015 | Yoon ............... H01M 8/04626 701/22 |
| 2016/0090078 | A1* | 3/2016 | Satomura ......... B60W 10/08 477/15 |
| 2017/0297451 | A1 | 10/2017 | Kim et al. |
| 2017/0305286 | A1 | 10/2017 | Kim |
| 2018/0248208 | A1* | 8/2018 | Aoki ............... H01M 8/04 |
| 2018/0294496 | A1* | 10/2018 | Takeda ............ H01M 4/86 |
| 2019/0006683 | A1* | 1/2019 | Shiomi ........... H01M 8/04343 |
| 2019/0168628 | A1* | 6/2019 | Pfeilschifter ...... B60L 53/11 |

FOREIGN PATENT DOCUMENTS

| | | |
|---|---|---|
| DE | 102015012108 A1 | 3/2017 |
| JP | 2005310429 A | 11/2005 |
| WO | 2011159241 A1 | 12/2011 |

OTHER PUBLICATIONS

Bertrandt et al. Spannungsklassen in der Elektromobilitat. ZVEI: Die Elektroindustrie. Dec. 2013. 44 pages.
DE Examination Report DE 10 2017 221 370.1 Filed Dec. 13, 2018. 10 pages.
Conductive Charging Systems for Electric Vehicles—Part 1: General Requirements; Dec. 2008; pp. 1-36; IEC 69/156/CD:2008).
European Search Report for European Application No. 18200871.4 dated Apr. 19, 2018.
German Examination Report for German Application No. 10 2017 221 370.1 dated Dec. 13, 2018.

* cited by examiner

SYSTEM AND METHOD FOR BATTERY CHARGING OF A FUEL CELL PLUG-IN HYBRID VEHICLE HAVING AN ELECTRIC COMPRESSOR OR TURBOCHARGER

CROSS-REFERENCE TO RELATED APPLICATIONS

This application claims foreign priority benefits under 35 U.S.C. § 119(a)-(d) to DE Application 10 2017 221 370.1 filed Nov. 29, 2017, which is hereby incorporated by reference in its entirety.

TECHNICAL FIELD

The claimed subject matter relates to a system and method for charging a battery of a fuel cell plug-in hybrid vehicle having an electric compressor or turbocharger.

BACKGROUND

A plug-in electric vehicle is generally understood to be a motor vehicle that may store electrical supplied via an external electrical energy source, such as a socket outlet, for example, in rechargeable batteries of the motor vehicle for supplying power to an electric drive motor. Such plug-in electric vehicles are often referred to as PEVs or PHEVs. These vehicles are a subgroup of electric or electrified vehicles that also include, inter alia, so-called BEVs or battery electric vehicles. Fuel cell plug-in hybrid vehicles have, in addition to plug-in electric vehicles, a fuel cell on board that makes available additional electrical power. Fuel cell plug-in hybrid vehicles generally also have a high-voltage battery on board, which acts as the store for the electrical energy. This high-voltage battery is charged via the fuel cell and can be connected to an external electrical energy source via a power cable so that said battery is also charged from the power supply system. As a result, there are potentially two different charging possibilities.

A charger, which may be located on board the vehicle, is needed to supply electrical power from outside via the power cable. This charger converts and rectifies the feed voltage and current drawn via the power cable into a charging voltage and current suitable for the high-voltage battery. The feed voltage is generally an AC (alternating current) voltage and may be present as a three-phase AC voltage at 380 V, for example. Firstly, it needs to be converted to the amplitude required for the charging voltage, and secondly it needs to be rectified.

If such a charger is provided in the vehicle, it requires additional cost, weight, and space for installation. Particularly in the case of motor vehicles manufactured in high numbers, these factors need to be taken into consideration as they result in increased costs and larger dimensions for the motor vehicle.

If the charger is designed for the total power with which the high-voltage battery of the motor vehicle can be charged, it is relatively large, heavy, and expensive. Therefore, the general course of action is to design the on-board charger for a lower power. However, this means that the charge time is extended. A charger generally requires a transformer and/or electronics comprising rectifiers and control units. The transformers are very heavy for the required power. The high weight is a disadvantage for constant transportation in a motor vehicle. A transformer is understood to mean a voltage transformer for AC voltage.

A combined system for electric traction drive and battery charging may be provided such as described in U.S. Pat. No. 5,099,186 A. In such systems while in driving mode, the electric drive motor of the motor vehicle is fed by a high-voltage battery and provides the torque necessary for the driving mode. In the charging mode, the drive motor acts as voltage transformer and converts the system voltage drawn externally into a voltage as is required, after rectification, by the high-voltage battery for charging. As a result, a separate transformer is no longer required.

Other systems such as those disclosed in WO 2011/159 241 may use the converter and portions of the winding of the electric drive motor of the motor vehicle for charging standard single phase or Level 1 charging. The use of three-phase or Level 3 charging in this proposition would simplify the use of switches for the connection to the electrical power supply system but may result in a torque in the rotor of the electric drive motor. It would therefore require the additional step of decoupling the motor from the drive train.

Other systems that use a drive motor as a transformer for modifying the voltage for battery charging are disclosed in U.S. Pat. No. 4,920,475 A and WO 2010/057 893. Representative fuel cell vehicles are disclosed in US 2007/0287046 A1, U.S. Pat. No. 7,743,861 B2 and JP 2005310429A.

The disclosures the prior art patents and publications described above are hereby incorporated by reference in their entirety.

SUMMARY

The claimed subject matter is generally directed to plug-in hybrid vehicles comprising a fuel cell that do not require a separate charger on board the vehicle to keep costs and weight low and conserve installation space otherwise required for this special charger while avoiding various disadvantages of previously known chargers and can be designed for full charging power.

The present inventors have recognized that motor vehicles operating using fuel cells generally have a compressor for feeding air into the cathode side of the fuel cell. The compressor can also be embodied as a turbocharger. It is driven via an electric motor rotationally connected to the compressor. The electric motor is typically designed for a power of 12 kW or higher. It is electrically connected to the high-voltage (HV) battery that is charged via the fuel cell arrangement or the power supply from the power supply system externally via the power cable. The HV battery is generally designed for a voltage of 280 V or more. The HV battery is electrically connected to the electric motor via a converter and motor controller.

In an embodiment of the disclosure, the power electronics of the converter that are present in any case as well as the electric motor of the compressor are utilized for the charging process. In this case, it proves to be advantageous that the power for which the converter and also the electric motor are designed is substantially in the same power range as a charger.

In an embodiment, the power electronics of the converter and the electric motor are used, in a first operating state, for supplying energy to the drive motor from the fuel cell and, in a second operating state, for the charging process of the HV battery. Here, use is made of the fact that both operating states generally do not occur at the same time. Although it is, in principle, possible for the HV battery of a plug-in hybrid vehicle connected to an external power supply system by means of a power cable to also receive electrical energy via the fuel cell at the same time during this charging process from the power supply system, this double supply is negligible and has little practicability since the energy supply via the external power supply system is substantially more efficient and, therefore, in practice there is no disadvantage if it is not possible for both operating states to be implemented at the same time. In addition, in one or more embodiments, it is possible to draw the total charging power from the power supply system so that there is no more capacity for additional charging of the battery via the fuel cell.

For various embodiments of fuel cell plug-in hybrid vehicles, the converter of the compressor is designed such that it can also be used for a charger operating in the high-voltage range for the plug-in function, i.e. can be used for charging the HV battery in accordance with charging standard Levels 1, 2, and 3.

In an embodiment of the disclosure, the converter of the compressor and the electric motor of the compressor are used for three-phase charging. As a result, the charging process can take place without any additional measures since the torque produced only drives the impeller of the compressor and the turbine rotates at the system frequency, i.e. approximately 3000 rpm at a system frequency of 50 Hz.

In various embodiments, in order to avoid a situation whereby air is transported through the cathode of the fuel cell when the fuel cell is not in operation and the HV battery is being charged externally via the power supply system, which could result in corrosion effects and impairment of the catalytic layer of the PEM (proton-exchange membrane) of the fuel cell, a valve which is often already present in any case, for example a shutoff valve, or a bypass valve, for example a throttle valve or a conventional valve, in particular from motor vehicle engineering, may be used, with the valve blocking the air path to the fuel cell in the charging mode and/or conducting all of the air transported through the impeller rotating at the system frequency to the outside.

The fact that specifically the combination of converter and electric motor of the compressor which may already be present in any case for the supply of air to the fuel cell is also used for the charging process makes charging possible in particular using three-phase current without the need for any particular additional precautions.

In an embodiment, the dual-use converter is designed for the power range which has the higher power demand. As a result, it can be used both for the charging process and for the normal driving mode, in which the fuel cell supplies electrical power to the drive motor.

In an embodiment, an HV battery has a voltage value corresponding to the rectified voltage value, present across the battery, of the system voltage used for the charging process. If, for example, a three-phase system voltage with three-pulse rectification is used, i.e. in each case only one rectifier is provided in each of the three phases, the voltage obtained across the battery is approximately 445 V DC. In the case of a higher number of rectifiers, for example a bridge circuit, higher output voltages are achieved. In this specific case, no conversion of the voltage level, i.e. the amplitude, is required. In this specific case, therefore, there is no need for a transformer which is implemented by the electric motor, for example. Only the converter is required and is equipped with a suitable switchover apparatus.

In an embodiment, the output shaft of the electric motor is connected exclusively to the compressor. Therefore, it does not also drive other apparatus which may then have to be disengaged during charging to prevent a rotation.

Two representative embodiments, which should not be interpreted as being restrictive, are described in more detail below and explained with reference to the drawings.

DETAILED DESCRIPTION

Figure 1:
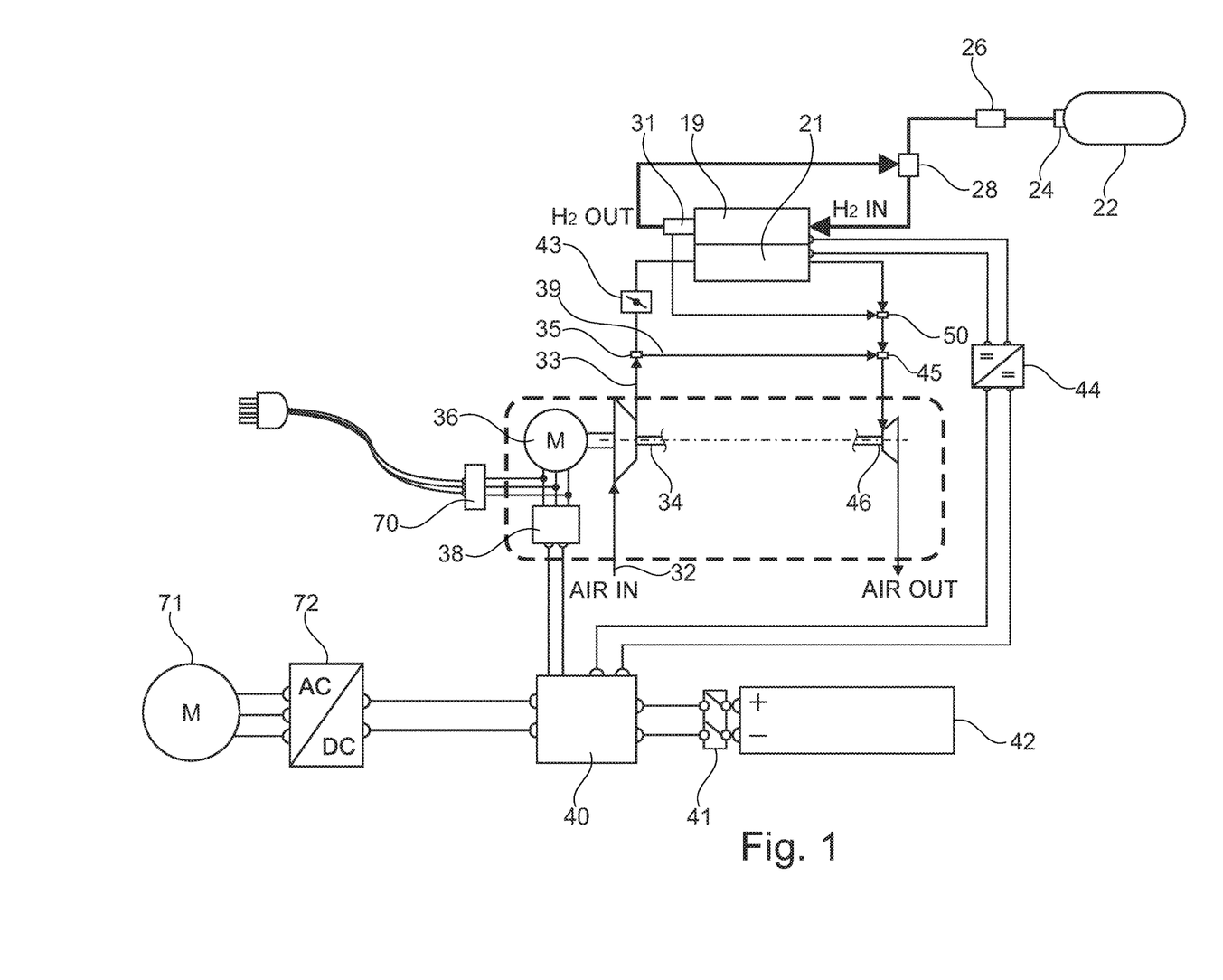
FIG. 1 shows a basic circuit diagram of architecture for an arrangement comprising a fuel cell and an electrical charging unit for a plug-in hybrid vehicle.
Figure 2:
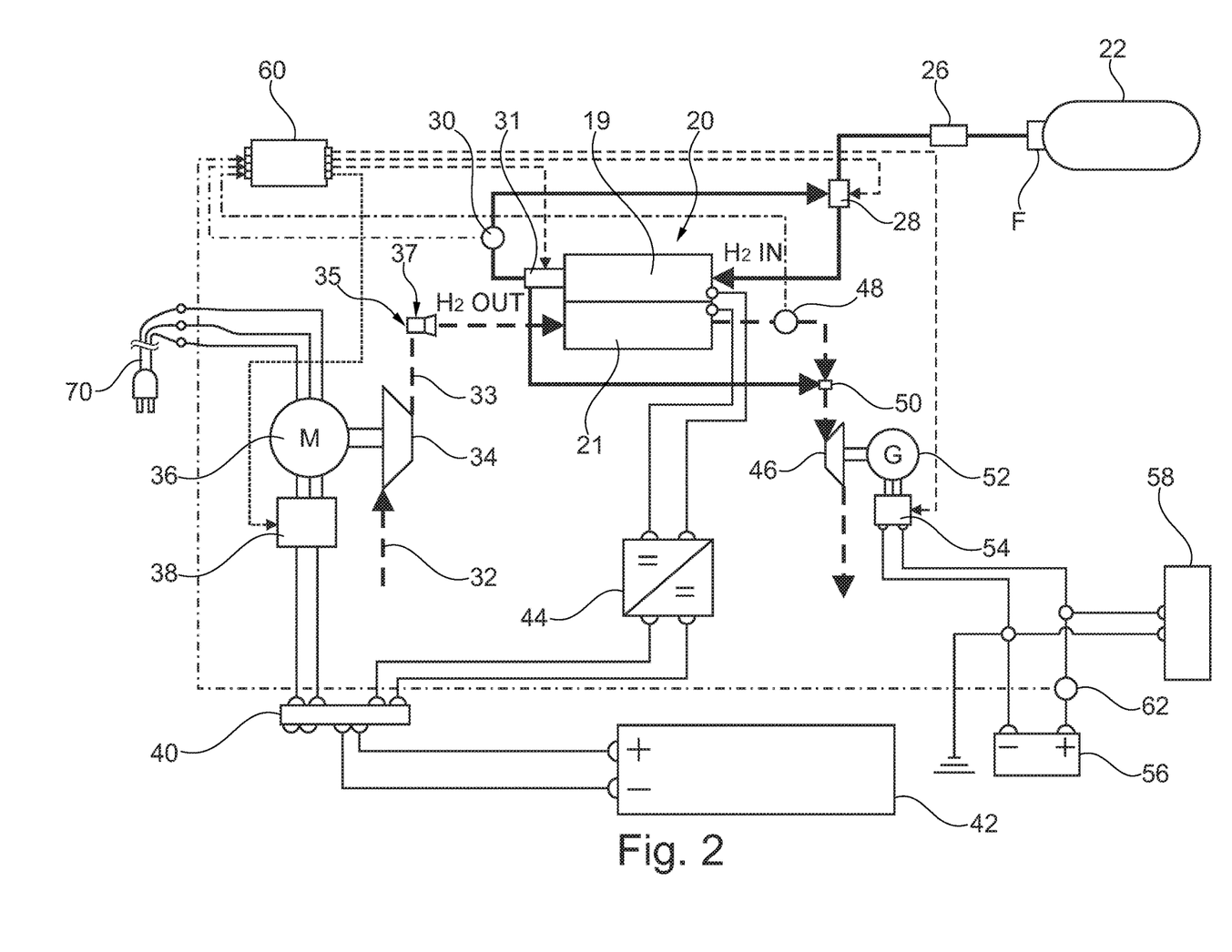
FIG. 2 shows a basic circuit diagram as in FIG. 1, but without any mechanical coupling between the compressor and the turbine.
Figure 3:
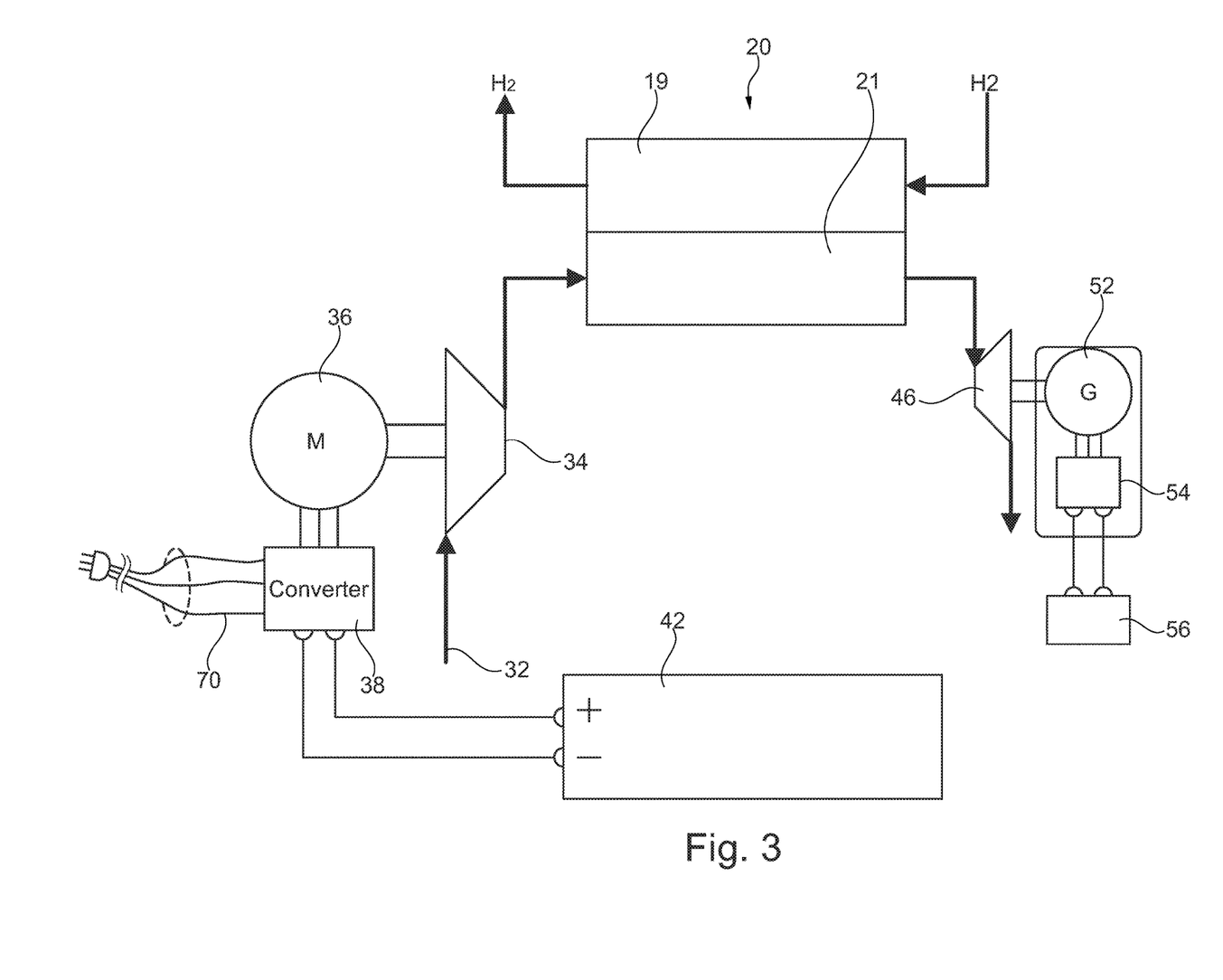
FIG. 3 shows a basic circuit diagram as in FIG. 1 and for the specific case where it is not necessary for any conversion of the amplitude of the system voltage into the battery charging voltage to take place.

FIGS. 1 to 3 show a hydrogen fuel cell 20, illustrated schematically. In each of the figures, the anode side 19 or hydrogen side is at the top, with the cathode side 21, also referred to as air side, underneath. A flow passes through these sides in the opposite direction. Hydrogen is supplied to the anode side 19. Provided for this purpose is a hydrogen tank 22 (FIG. 1) in which gas is stored under elevated pressure. Hydrogen tank 22 is capable of being closed off via a tank valve 24 and is connected to a feed line having a pressure regulator 26. The feed line opens out into the anode side 19, and an ejector pump 28 is also inserted into the feed line. Said ejector pump can also be in the form of a circulation pump or fan. It serves the purpose of sucking in hydrogen gas flowing out of the anode side and guided in an exhaust gas line and feeding it back into the feed line in the region of the ejector pump 28. In FIG. 2, a pressure sensor 30 is also provided in the exhaust gas line and senses the exhaust backpressure at the output of the anode side 19. It is also possible for a differential pressure meter to be provided which detects the differential pressure between the anode and the cathode.

FIGS. 1 to 3 now additionally show the following: The cathode side 21 is charged with air. For this purpose, air is sucked in by a compressor 34 via an air inlet 32. An air supply line 33 leads from the compressor 34 to the cathode side 21. In the embodiments shown in FIGS. 1 and 2, a valve 35, in this case embodied as a two-way valve, is inserted into this air supply line 33. FIG. 2 now shows the following: In a first valve position, the path from the compressor 34 to the cathode side 21 is free, whereas the path to an outlet 37 is blocked. In the second valve position, the path from the compressor 34 to the outlet 37 is free, and the path from the compressor 34 to the cathode side 21 is blocked. In an alternative, a bypass valve is arranged parallel to the cathode side 21. If the bypass is open, virtually all of the air flows through the bypass so that there is no flow through the fuel cell 20. Such an alternative is shown in FIG. 1. According to FIG. 1, the air provided by the compressor 34 is conducted via the valve 35 either to the cathode side 21 or into a system bypass line 39. Said system bypass line leads to a second valve 45, which is inserted into an exhaust air line, which connects the output of the cathode side 21 to a turbine 46. A throttle valve 43 is inserted between the valve 35 and the cathode side 21. The valve 35 can also permit intermediate positions.

In FIGS. 1 to 3, the compressor 34 is driven via a motor M 36. A converter 38 is connected electrically in series with motor 36 (see FIGS. 1 and 2), and additionally functions as the motor controller. Converter 38 is connected on the primary side to a distribution box 40, which in turn is connected to a high-voltage battery 42.

In the embodiment shown in FIG. 1, a contact switch 41 is inserted between the distribution box 40 and the high-voltage battery 42.

In FIGS. 1 and 2, the output of a DC-to-DC converter 44 is also connected to the distribution box 40. Said DC-to-DC converter is connected on the input side to the fuel cell 20. The electrical power generated by the fuel cell 20 is drawn via the converter 44 and finally supplied to the high-voltage battery 42 for the purpose of charging it. From there, the electrical power required for driving the vehicle can be drawn, as shown in FIG. 1. There, an inverter 72 is connected to the distribution box 40, with the inverter for its part being connected to an electric drive machine 71 for the traction drive.

On the output side, the air flows out of the cathode side 21 through the exhaust air line to the turbine 46. The turbine is set in rotation by the kinetic energy of the exhaust air, and the air flows out at an air outlet. A cathode pressure sensor 48 can be inserted into the exhaust air line (see FIG. 2).

A flush valve 31 is arranged at the output of the anode side 19 and is connected directly to the fuel cell 20, in this embodiment. A flushing output of this flush valve 31 is connected to a collection point 50 (see FIGS. 1 and 2), to which the exhaust air line is also connected. In this way, during flushing, hydrogen gas flows together with the exhaust air and together they reach the turbine 46. In this way, the kinetic energy of the flushing gas is also utilized.

In FIG. 1, the compressor 34 and the turbine 36 are rotationally connected. In FIGS. 2 and 3, this is not the case. Instead, the turbine 46 is drive-connected to a generator G 52 and drives this generator 52. The generator 52 is driven exclusively by the turbine 46 and is exclusively rotationally connected thereto. An inverter 54, which is at the same time also designed as a control device for the generator 52, is connected downstream of the generator 52. The output of said inverter is connected to a low-voltage battery 56. At the same time, said inverter is connected to consumers 58 (not illustrated in any more detail here) operating on a low voltage. Low voltage is understood to mean a voltage which is no higher than 48 V. These consumers are in particular apparatus which belong directly to the fuel cell 20.

The arrangement shown in FIG. 2 is controlled by a controller 60, which monitors and controls the entire arrangement. For this purpose, said controller is connected to individual component parts, in particular the inverter 54, the ejector pump 28, the flush valve 31 and the converter 38, as indicated via dashed control lines. It receives its input signals as indicated via dash-dotted lines (illustrated by way of example here are an input line for the pressure sensor (cathode) 48, an input line for the pressure sensor (anode) 30 and an input line for a voltage sensor 62 on the positive side of the low-voltage battery 56). The negative side of the low-voltage battery is connected to ground. An input line which comes from the converter 38 and transmits the state, in particular the switching state, thereof is also provided.

The motor M 36 generally has a stator and a rotor. The stator and the rotor each have windings. For example, the three windings of the rotor are connected to the converter 38. The three windings of the stator are connected to a power supply line 70. Said power supply line ends in a plug. However, it may also be the other way around, i.e. the power supply line can be connected to the windings of the rotor, in which case the stator is connected to the converter 38. It is possible for the stator and/or the rotor to have more than one individual winding or winding taps for each of the three windings. In this case, per phase, one of the individual windings or the entire winding arrangement is used for one state, for example the first operating state which is a driving state, while the other individual winding or the section between the tap and an end winding is used for the second operating state. The individual windings or the taps are each selected such that the desired or optimum power of the fuel cell is achieved for the first operating state and the desired conversion of the amplitudes is achieved for the second operating state.

For the case where there is no three-phase system voltage present, but only a single-phase voltage, for example, a similar procedure is followed.

The valve 35 inserted into the air supply line 33 preferably has a motor drive, which is connected to the control device 60 and is controlled thereby.

At least one voltage sensor may be provided, which is connected to an electrical supply line of the motor 36 and is electrically connected to the control device 60. If the voltage sensor senses an electrical system voltage on the voltage supply line 70, this results in the control device presetting the second operating state.

The embodiment illustrated in FIG. 3 shows the specific case whereby conversion of the voltage value of the system voltage to the battery charging voltage is not required. This specific case is possible if the voltage of the HV battery 42 has been selected such that it corresponds to a rectified voltage value of the AC voltage drawn from the power supply system. By selecting the type of rectification, for example only one rectifier per phase, a bridge rectifier or even voltage multiplication in the region of the rectifiers, certain design freedom for the selection of the voltage of the HV battery 42 is provided.

In FIGS. 1 to 3, the converter 38 is connected in three phases both to the motor M 36 of the compressor 34 and to the power supply line 70. Switches which are switched into the two operating states by the controller 60 (see FIG. 2) or other actuating means are preferably provided in the converter 38. Thus, in the first operating state, the high-voltage battery 42 supplies electrical power to the motor 36 via the converter 38. In a second operating state, which corresponds to a second switch position, electrical power is supplied from a power supply system to the HV battery 42 via the power supply line 70. In the case of a system voltage of 380 V AC (three-phase), for example, a DC voltage value of approximately 445 V can be obtained when a (only one) diode is used as a rectifier in each phase, so-called half-wave rectification, with the HV battery 42 being designed for this value ±20%. In this case, special charging electronics are also provided in the converter 38 that adapt or modify the DC voltage such that the appropriate voltage is present across the HV battery 42 for the respective state of charge of the HV battery 42.

Figure 4:
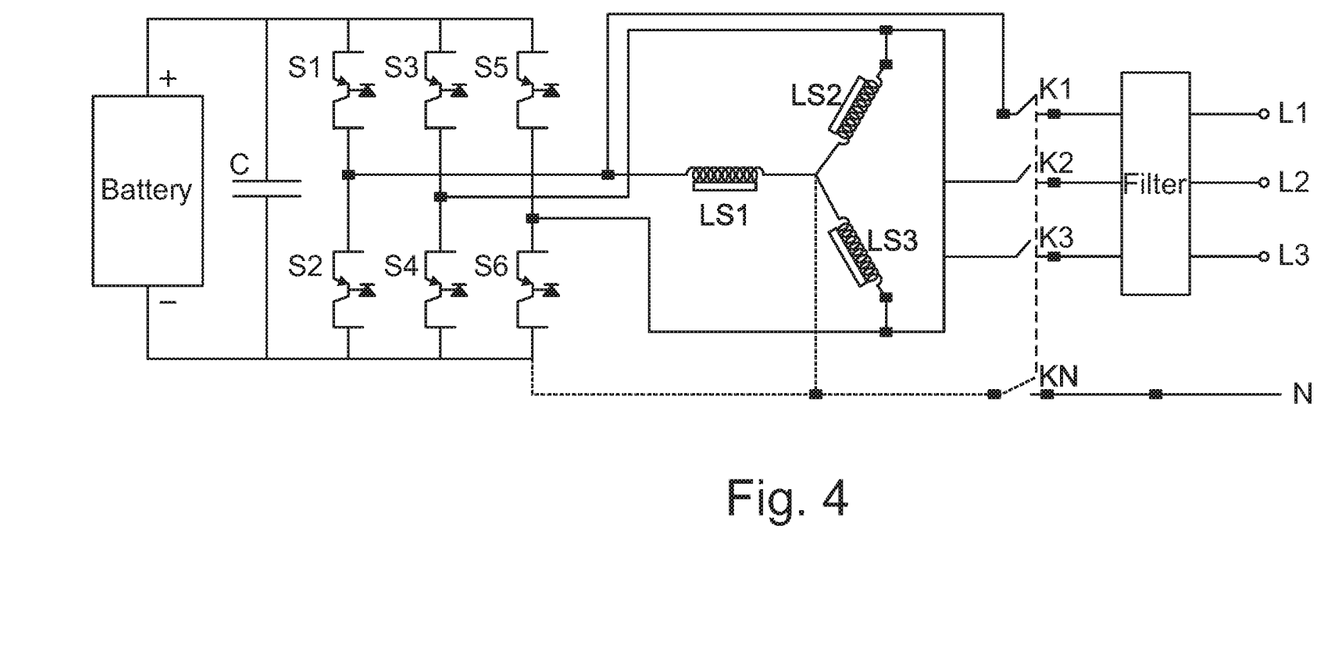
FIG. 4 shows a circuit diagram of an electrical charging unit of a plug-in hybrid vehicle.

FIG. 4 shows a circuit diagram of an electric turbocharging unit. It is connected to an external three-phase power supply system (not illustrated), with the supply lines being denoted by L1, L2 and L3 for the phases and N for the neutral. System faults or the like are eliminated by a filter. The four supply lines are connected to a multi-circuit switch having the four switching blades or tongues K1, K2, K3 and K4 on the output side of the filter. During the charging mode of the high-voltage battery via the external power supply system, the multi-circuit switch is closed. When the external power supply system has been disconnected, all of the switching tongues K1, K2, K3 and K4 are open.

The four supply lines open out into a bridge circuit comprising six heavy-duty electrical power switches S1 to S6. Here, components from semiconductor technology, for example thyristors or transistors, are preferred. On other side, the DC voltage side, this bridge circuit is connected to the high-voltage battery. In addition, a capacitor is connected in parallel with the heavy-duty power switches Si to S6 there.

An electric machine in the form of a three-phase AC machine is connected to the four supply lines and therefore on the AC voltage side, said electric machine being represented in FIG. 4 by the three inductances LS1, LS2 and LS3 corresponding to the three electrical phases.

FIG. 3 shows a more specific representative embodiment of the use of a 3 kW alternator of a motor vehicle in connection with a controllable rectifier. The anode side and the air input side of the cathode are as illustrated in FIG. 2. In contrast to FIG. 2, the first inverter 38 is connected directly to the HV battery 42, i.e. there is no distribution box 40. In turn, a turbine 46 is provided on the exhaust gas side, said turbine now being mechanically rotationally connected directly to the alternator G. Said turbine in this case forms an example of a specific design of the generator 52. A controllable rectifier, for example a charge regulator, which in this case is an example of a specific design of the second inverter 54, is connected downstream of the alternator G. Said rectifier is connected to a low-voltage battery 56 on the output side.

In the method for controlling the fuel cell system, a set value for the rotational speed of the compressor 34 is determined by taking into consideration an input value for the required power of the fuel cell 20, a measured value for the actual mass flow of air, a measured value for the present cathode pressure 48 and an input value for the voltage of the low-voltage battery 56. On the basis of the presently required power of the fuel cell 20, a value for the cathode pressure 48 and a manipulated variable for the airflow are calculated. A decision value both for the mass flow of air and for the cathode pressure is determined, wherein, as a matter of priority, the demanded power of the fuel cell 20 and/or the battery voltage of the low-voltage battery 56 is taken into consideration.

The fuel cell system of a motor vehicle has a fuel cell 20, which has an anode side and a cathode side, a compressor 34, which is rotationally connected to a motor M 36 and is connected to the cathode side of the fuel cell 20 via a supply line, and a turbine 46, which is connected to the cathode side via an exhaust air line and is additionally exclusively rotationally connected to a generator G 52, which is connected on the output side to a second inverter 54 and to a low-voltage battery 56.

In a fuel cell plug-in hybrid vehicle comprising a fuel cell 20, which has an anode side 19 and a cathode side 21, comprising a compressor 34, which is connected to the cathode side 21 via an air supply line 33, comprising an electric motor 36, which is drive-connected exclusively to the compressor 34, comprising a converter 38, which is connected electrically on one side to the motor 36 and on the other side to a high-voltage battery 42, and comprising a controller 60, which switches the vehicle into two different operating states, in a first operating state, the high-voltage battery 42 supplies electrical power to the motor 36 via the converter 38 so that the electric motor 36 drives the compressor 34. In a second operating state, an electrical voltage is supplied from a power supply system to the motor 36 or to the converter 38 via a power supply line 70. The motor 36 can preferably modify the amplitude of the system voltage. The possibly modified voltage is present across the converter 38, and the converter 38 converts the voltage into a DC voltage, which is present across the high-voltage battery 42.

What is claimed is:

1. A vehicle comprising:
   a fuel cell connected to a compressor;
   a motor drive-connected exclusively to the compressor;
   a converter connected electrically between the motor and a battery; and
   a controller configured to switch between a first state with the battery powering the motor to drive the compressor, and a second state with the motor connected to modify voltage from an external power supply for the converter to supply a DC voltage to charge the battery.

2. The vehicle of claim 1 further comprising:
   a valve in communication with the controller and positioned between the compressor and the fuel cell.

3. The vehicle of claim 2 wherein the controller is configured to operate the valve such that airflow from the compressor bypasses the fuel cell while operating in the second state.

4. The vehicle of claim 1 further comprising a turbine connected to the fuel cell.

5. The vehicle of claim 4 wherein the compressor and the turbine are fluidly connected to a cathode side of the fuel cell.

6. The vehicle of claim 4 wherein the turbine is mechanically coupled to the compressor.

7. The vehicle of claim 6 further comprising an alternator coupled to a second battery, wherein the turbine is mechanically coupled to drive the alternator and charge the second battery.

8. The vehicle of claim 1 wherein the controller is configured to select the second state responsive to detecting external power supply voltage.

9. A vehicle comprising:
   a fuel cell;
   a motor driving a compressor to supply airflow to the fuel cell;
   a battery;
   a converter electrically connected between the motor and the battery;
   a plug configured to selectively connect the motor to an external voltage to modify amplitude of the external voltage supplied to the converter and charge the battery; and
   a controller configured to reduce the airflow to the fuel cell responsive to detecting the external voltage.

10. The vehicle of claim 9 further comprising a turbine connected to the fuel cell.

11. The vehicle of claim 10 wherein the turbine is mechanically connected to the compressor.

12. The vehicle of claim 10 further comprising a generator, wherein the turbine is mechanically connected to the generator.

13. The vehicle of claim 9 further comprising a valve positioned between the compressor and the fuel cell and connected to the controller, wherein the controller is configured to control the valve to bypass the airflow around the fuel cell responsive to detecting the external voltage.

14. The vehicle of claim 9 wherein the controller is configured to reduce the airflow by controlling at least one valve.

15. The vehicle of claim 14 wherein the at least one valve comprises:
- a bypass valve that redirects at least a portion of the airflow between an airflow inlet and an airflow outlet of the fuel cell; and
- a throttle valve coupled to the fuel cell and the bypass valve.

16. A fuel cell plug-in hybrid vehicle comprising:
- a fuel cell having an anode side and a cathode side;
- a compressor connected to the cathode side via an air supply line;
- an electric motor mechanically coupled to the compressor;
- a high-voltage battery;
- a converter connected electrically between the electric motor and the high-voltage battery; and
- a controller configured to switch between at least a first operating state wherein the high-voltage battery supplies electrical power to the electric motor via the converter to drive the compressor, and a second operating state, wherein an external power supply voltage is connected to at least one of the electric motor and the converter such that the electric motor modifies amplitude of the external power supply voltage and supplies the modified voltage to the converter, and the converter converts the voltage into a DC voltage supplied to the high-voltage battery to charge the high-voltage battery.

17. The fuel cell plug-in hybrid vehicle of claim 16 further comprising a turbine positioned to be driven by airflow exiting the cathode side of the fuel cell.

18. The fuel cell plug-in hybrid vehicle of claim 17 wherein the turbine is mechanically connected to the compressor.

19. The fuel cell plug-in hybrid vehicle of claim 17 wherein the turbine is mechanically connected to an alternator.

20. The fuel cell plug-in hybrid vehicle of claim 17 wherein the controller activates the second operating state in response to detecting the external power supply voltage.

* * * * *